Figure 18:
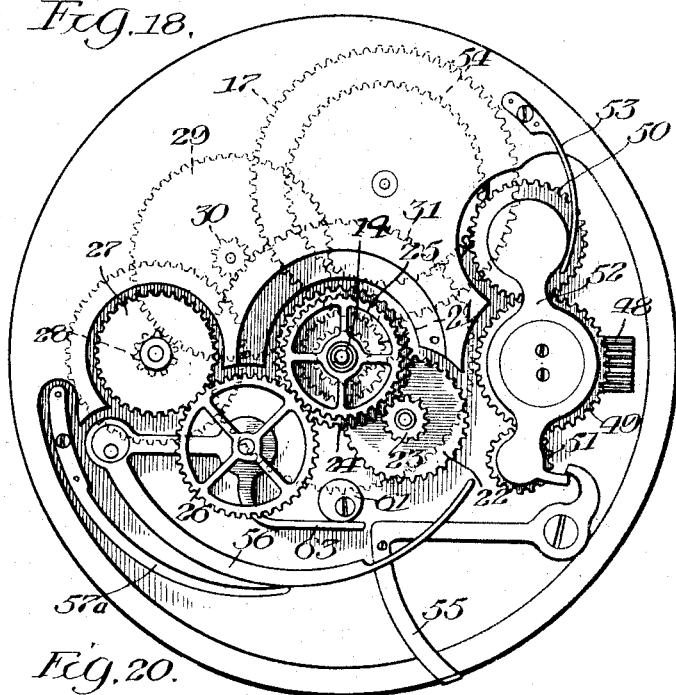

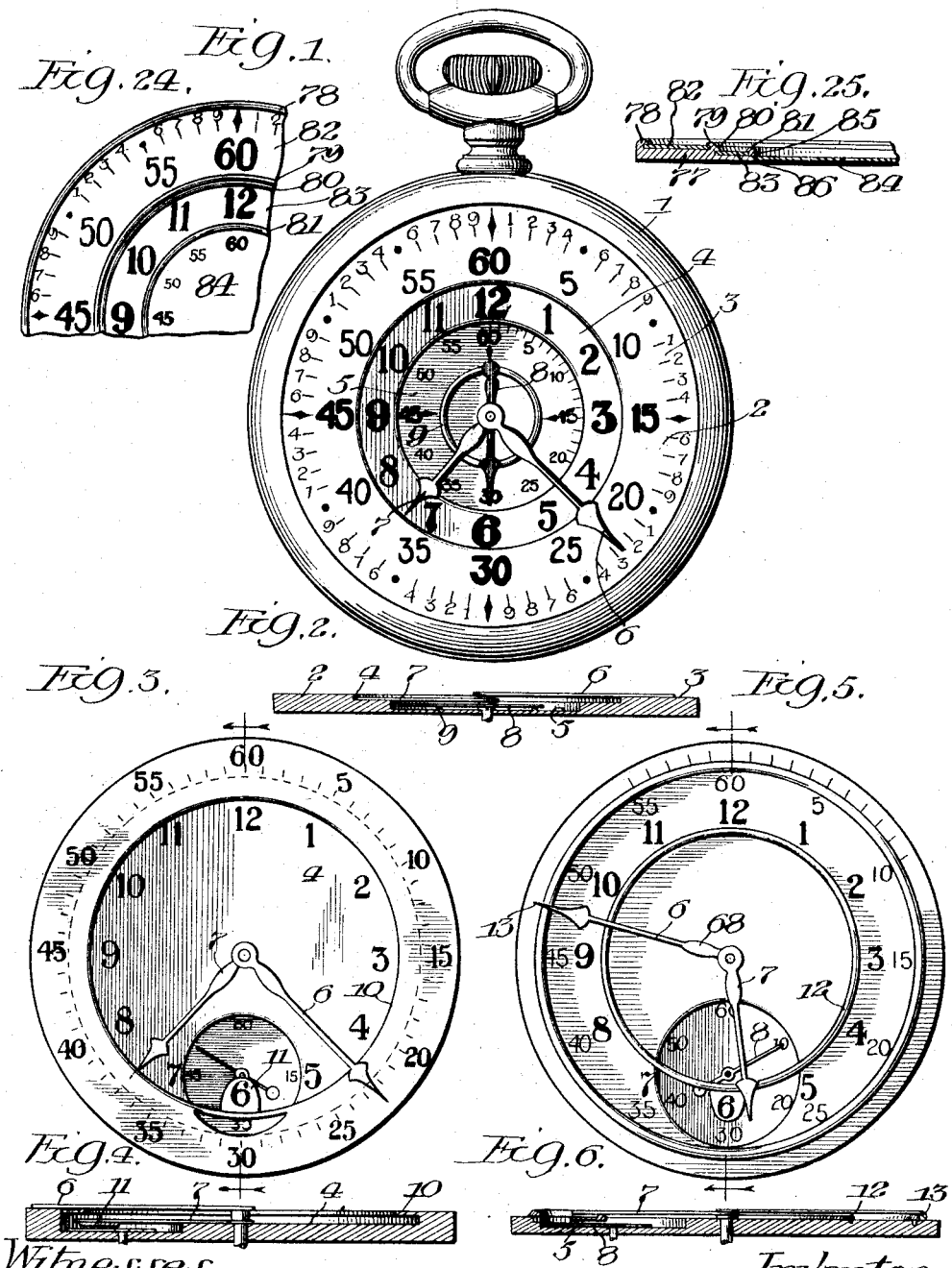

H. A. BORRESEN.
HOROLOGICAL INSTRUMENT.
APPLICATION FILED NOV. 25, 1910.
1,192,811.
Patented July 25, 1916.
4 SHEETS—SHEET 2.
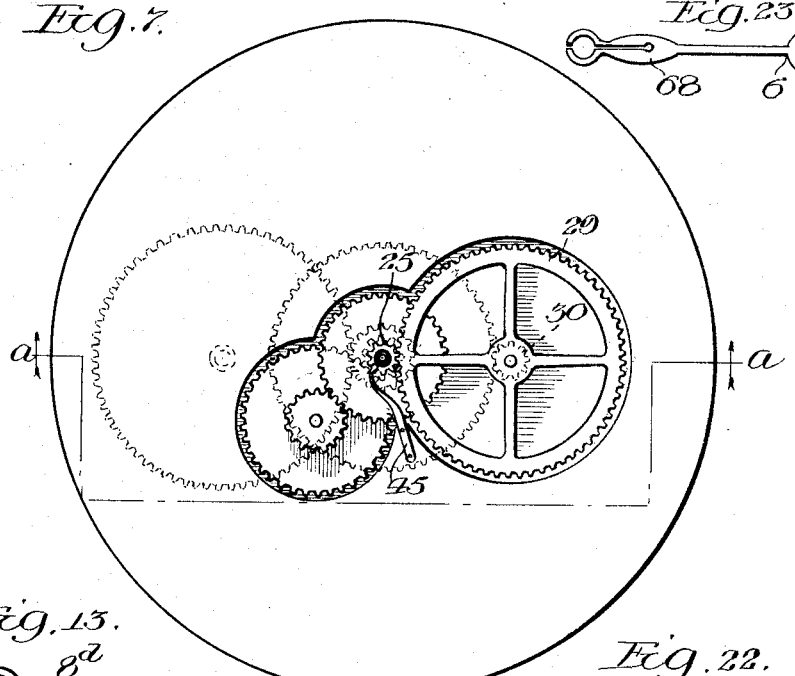
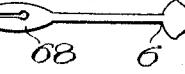
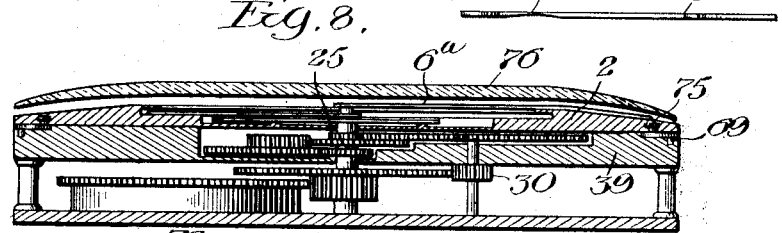
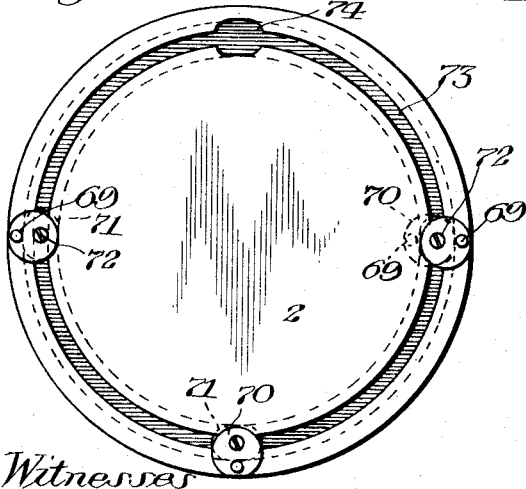
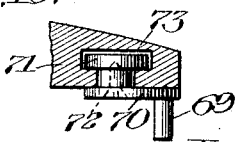
Witnesses
Inventor
Helge A. Borresen
by Max W. Zabel Atty.

H. A. BORRESEN.
HOROLOGICAL INSTRUMENT.
APPLICATION FILED NOV. 25, 1910.
1,192,811.
Patented July 25, 1916.
4 SHEETS—SHEET 3.
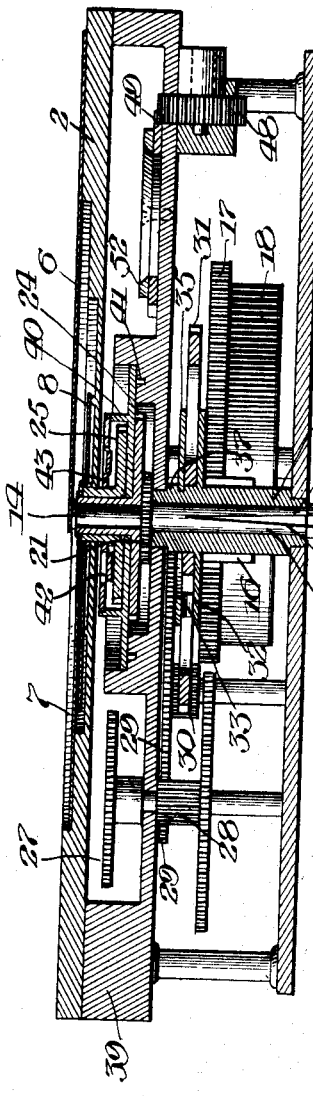
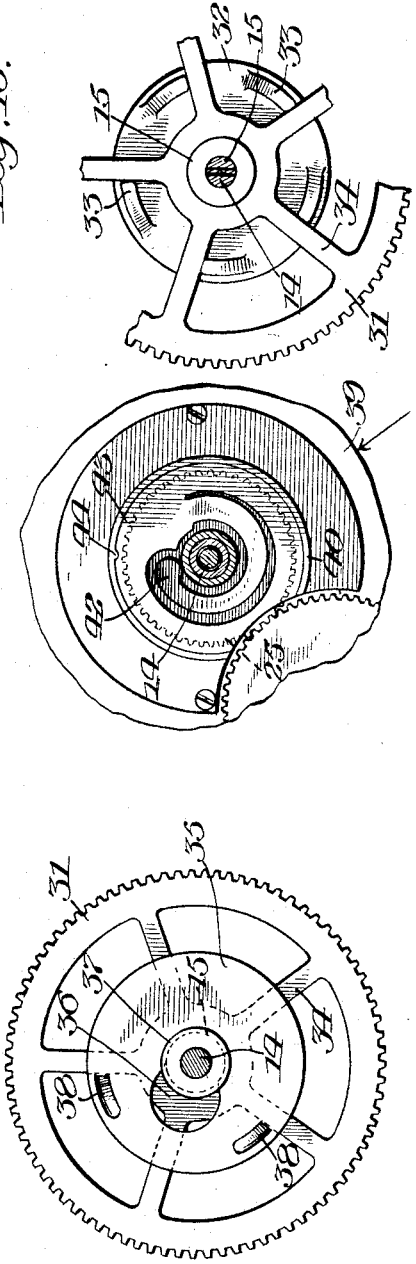
Witnesses
O. M. Wermich
Hazel Jones.
Inventor
Helge A. Borresen
by May W. Zabel
Atty

H. A. BORRESEN.
HOROLOGICAL INSTRUMENT.
APPLICATION FILED NOV. 25, 1910.

1,192,811.

Patented July 25, 1916.
4 SHEETS—SHEET 4.

Witnesses
Inventor
Helge A. Borresen

UNITED STATES PATENT OFFICE.

HELGE A. BORRESEN, OF MARQUETTE, MICHIGAN, ASSIGNOR TO MAX W. ZABEL, TRUSTEE, OF CHICAGO, ILLINOIS.

HOROLOGICAL INSTRUMENT.

1,192,811.  Specification of Letters Patent.  Patented July 25, 1916.

Application filed November 25, 1910. Serial No. 594,168.

*To all whom it may concern:*

Be it known that I, HELGE A. BORRESEN, a citizen of the United States, residing at Marquette, in the county of Marquette and State of Michigan, have invented a certain new and useful Improvement in Horological Instruments, of which the following is a full, clear, concise, and exact description, reference being had to the accompanying drawings, forming a part of this specification.

My invention relates to horological instruments and is of more particular use in connection with watches and clocks, and has for its object the provision of improved instruments of this character.

My invention contemplates the provision of positive means for guiding the hands of such instruments and preventing interference between the hands. Also the provision of concentric dials, one for each hand, in coöperation with segregated indicia for each dial.

My invention further contemplates the arrangement of these dials in different planes, preferably in such a manner as to provide unbroken hand guide tracks. This facilitates reading of the time by having the indicia radiating from a common center.

My invention is also designed to utilize practically all of the available dial space for the numerals and this is accomplished by virtue of the construction above set forth.

In one of the preferred forms of my invention, I arrange the second hand, of smaller size than the hour hand, and arrange the second indicia within the hour indicia, and arrange the minute indicia surrounding the hour indicia. In this way the numerals take their position of relative importance so far as reading of time is concerned. I also arrange to take up the end and side play of the gears by the construction which will be described presently. The arrangement outlined above permits the allotment of the very smallest possible amount of space for the accommodation of the hands without entanglement thereof.

By the use of the structure of my invention, I provide means for properly setting the second hand without injuring the pivot or arbor thereof, my invention contemplating in one of its forms release or freeing the second wheel from the movement train, while setting the hour and minute hands in the usual way, thus all hands can be properly set without injury to the mechanism. By guiding all the hands they are intimately associated with their dials and thus facilitate the correct reading of time. I provide further unbroken guide tracks for the hands and unbroken fields for the indicia of each dial. By arranging the second hand concentrically, I may place the winding pinion at its most advantageous point so far as the movement of the watch is concerned. This also permits me to use a one piece dial to coöperate with all of the hands in their true planes. This also permits me to provide interchangeable dials for hunting case or open face watches as desired.

My invention also contemplates a reconstruction of the center pinion whereby the bearings of the hand driving mechanism will occupy less space than heretofore. The arrangement of hands will permit the reading of illuminated dials in the dark from a common center. In this manner all of the indicia are segregated and uninterrupted. I also provide an improved recoiling center pinion mechanism.

In accordance with the preferred embodiment of my invention, the second hand and dial is located in a plane lower than any other dial.

I also provide a one piece center pinion with spring lock and release mechanism in one form of my invention to simplify and give strength to the construction of the bore of said pinion coöperating with the spring frictional center minute pinion. In this form the center pinion is carried in positive alinement and frictionally engages the bore of the center pinion.

My invention also contemplates the provision of means whereby to permit the hour wheel to operate directly upon the center wheel arbor.

Several features above described which will be described in detail herein in order to facilitate understanding of the various parts herein have been divided out of this application and form the basis of my application Serial No. 664,251 filed December 6, 1911, which features relate particularly to the concentric arrangement of the second hand as respects the other hands, also the particular features of the arrangements of the indicia, and certain particular dial features.

Figure 21:
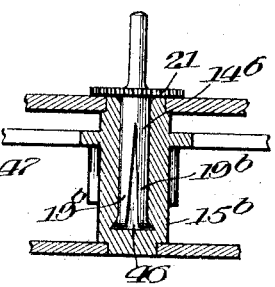
Figure 20:
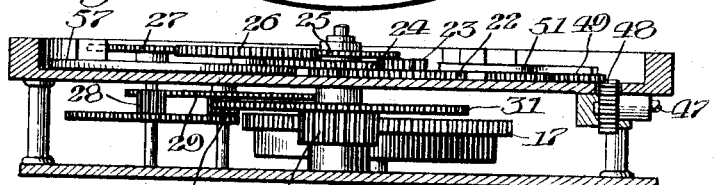
Figure 19:
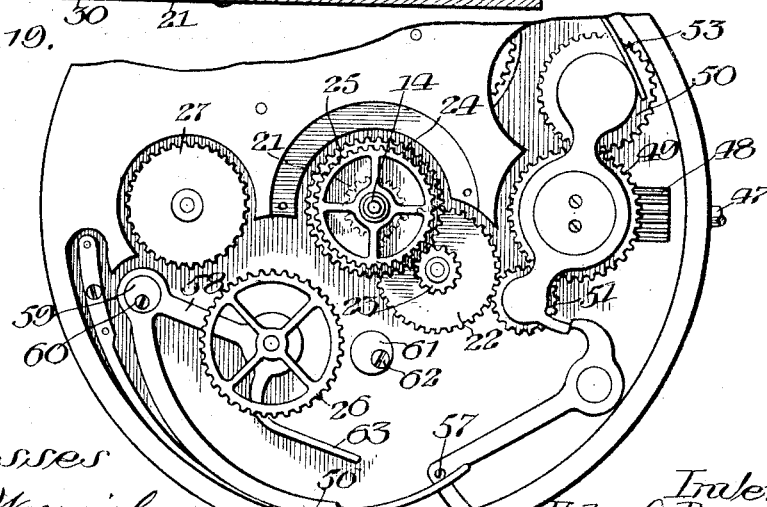

This and other objects will be more clearly apparent from the construction which I will now describe in connection with the accompanying drawings illustrating the preferred embodiments of my invention, in which:

Figure 1 is a plan view of a watch illustrating my improved dial features; Fig. 2 is a sectional view of the dial and hands thereof; Fig. 3 is a plan view of a modified form of my improved dial; Fig. 4 is a sectional view thereof; Fig. 5 is a modified form of my improved dial; Fig. 6 is a sectional view thereof; Fig 7 is a view of a portion of the movement illustrating my improved means for preventing dislocation of the hand operating devices; Fig. 8 is a sectional view on lines $a$ $a$ of Fig. 7; Fig. 9 shows my improved interchangeable dial; Fig. 10 is a detail view more clearly illustrating the construction set forth in Fig 9; Fig. 11 is my improved second pinion showing means for retaining the hand; Figs. 12 and 13 are views of hands for use in connection with the apparatus shown in Fig. 11; Fig 14 is a sectional view of a watch movement illustrating my improved center arbor and other details of construction; Figs. 15 and 16 are detailed views setting forth the recoil mechanism shown in section in Fig. 14; Fig. 17 is a detail view of the mechanism shown in Fig. 14 showing a modified form of carrying out the functions of the structure illustrated in Fig. 7; Fig. 18 shows the watch movement to illustrate the setting mechanism; Fig. 19 shows the same in its alternative position; Fig. 20 is a sectional view thereof; Fig. 21 shows a modification of the center arbor shown in Fig. 14; Figs. 22 and 23 are detail views of an improved hand, and Figs. 24 and 25 are plan and sectional views respectively of an improved dial construction.

Referring more particularly to Figs. 1, 2, 3, 4, 5 and 6, I show a watch 1 having a dial 2 which is shown more clearly in section in Fig. 2. This dial has three tracks for indicia. The track 3 for the minute indicia, the track 4 for the hour indicia and the track 5 for the second indicia, all concentrically arranged and in different planes as shown more clearly in Fig. 2. The minute hand 6 is arranged upon its center arbor in such a manner that the said hand rests upon the track 3, the hour hand 7 is arranged close to the track 4 so that it may rest upon the same, and the second hand 8 operates upon a rail 9 which guides it in its movement and against which said second hand presses slightly. The three hands are thus guided by their respective dials and by being so arranged as to work in harmony are associated with the dials preferably by exerting a slight pressure against them, are prevented from falling away therefrom and becoming entangled with the other hands. The dials themselves are the guides of the hands and prevent said hands from assuming a lower position than is designed for them so that they cannot press inwardly to engage the hands below, and the slight pressure of the hands against the dial is sufficient to compensate for any lost motion which would tend to elevate the hands above their respective guides or tracks.

In Figs. 3 and 4, I show a modification in which the hour hand 7 is not only guided by the dial track but is also arranged below an annular rim 10 which prevents it from moving upwardly into engagement with the minute hand 6. The guide for the hour hand is complete as illustrated by the portion 11 provided for the numeral 6 which forms a continuous strip on an even surface with the surface of the track 4. The annular rim 10 is continuous as will be apparent from the plan view shown in Fig. 3.

In the modification shown in Fig. 5, the hour hand 7 rests upon a rail 12 and the minute hand rests upon a rail 13. In this manner again the hands are positively guided and prevented from coming together. The advantage of concentrically arranging the dials permits the use of the maximum space for the indicia and this concentric arrangement is brought about by means of the improved constructional features of my invention as will more clearly apear hereinafter. Unbroken dial tracks are provided and positive guides for the hands throughout their entire revolution. Likewise raised tracks for the different hands are contemplated to guide them in their true planes. By having the dial tracks in different planes, I am enabled to properly segregate the indicia, thereby also keeping the indicia close to the hands. I also preferably have alined indicia for the hours and quarter hours of heavier characters to facilitate reading in the dark, these alined indicia forming in one embodiment two lines at right angles thus dividing the dial space into quadrants.

In order to arrange for the concentric mounting of the second hand below the hour hand necessitates driving the second hand differently than hitherto, and this is brought about by means of improved constructional features, some of which contemplate a rearrangement of the center arbor for carrying the minute hand, and a portion of which features I will now describe in connection with Figs. 14, 15, 16 and 17. The improved structure above outlined when used in connection with my improved dial 2 comprises a frictional center arbor 14 having frictional engagement with a sleeve 15 carrying the center pinion 16, which center pinion is in direct association with the driving pinion 17 of the main spring 18. The sleeve 15 is driven by the center pinion 16 and the center arbor 14 is so arranged as to have frictional engagement with this sleeve by virtue of spring action to be presently explained, so that the sleeve 15 drives this center arbor 14 to which is fastened the minute hand 6. In order to obtain this frictional engagement, the arbor 14 is bifurcated and has two legs 19, 19 and enlarged portions 20 on the end thereof, which legs tend to push outwardly so that when said arbor is forced through the sleeve 15 so that the enlarged portions 20 protrude through the opposite side as shown assembled in Fig. 14, then the spring action outwardly of these legs 19 against the interior periphery of the sleeve 15 provides adequate frictional engagement whereby to drive the said arbor from the main spring 18. As thus illustrated the mechanism consisting of the main spring and barrel 18 drives the gear 17 which thereupon rotates the gear 16 associated with the spindle 15. On account of the frictional engagement between the arbor 14 and the sleeve 15 the movement of the sleeve 15 is transmitted to said arbor 14 and from there to the minute hand 6. The arbor 14 also carries a pinion 21 fixedly secured to said arbor, which pinion 21 drives the gear wheel 22 shown in Fig. 18. The gear wheel 22 is fixedly secured to the pinion 23 which thereupon drives the pinion 24 which is here shown as a sleeve bearing wheel and carries the hour hand 7. The second hand 8, also preferably mounted on a sleeve pinion or wheel 25 surrounding the sleeve wheel 24 is driven readily, as shown in Fig. 7 or in Fig 18, but I will describe only the general manner of driving this pinion as shown in Fig. 18, reserving however for a later portion of this description the detailed novelty of the mechanism set forth in Fig. 18. Referring specifically therefore to Fig. 18, the sleeve wheel 25 is in association with a pinion 26, which pinion 26 is driven by the gear wheel 27, which gear wheel by being fixedly secured to a gear wheel or pinion 28 receives its rotation through the agency of a gear wheel 29. The gear wheel 29 is fixedly secured to a pinion 30, which pinion is in direct association and receives its rotative impulse from the gear wheel 31.

My invention contemplates the improved mounting of the gear wheel 31 so that it is driven conjointly with the sleeve 15, but which gear wheel is so mounted that it is not responsive to a reverse rotation of the sleeve 15 which occurs, for instance, when the main spring 18 through some breakage recoils and unwinds. The novel mounting of the gear 31 is set forth more clearly in Figs. 14, 15, and 16. The sleeve 15 is provided with a plate 32 having upwardly extending spring portions 33 which are preferably punched out of the body of the plate 32 and extend upwardly so that they may engage the arms 34 of the gear wheel 31. It might be said that these projections 33 do not extend upwardly along the arms 34 a greater distance than one-half the thickness of said arms in the specific embodiment herein shown as there are other springs of a similar nature coöperating with these arms as will presently appear. I, of course, do not limit myself to such specific construction, but am merely describing the particular embodiment of my invention herein set forth. The gear wheel 31 rests upon the plate 32 and normally is driven in the direction of the arrow shown in Fig. 16 by the said plate 32 which is an integral part of the sleeve 15. Upon the top of the gear wheel 31 I place a further plate 35 which has an opening 36 large enough to accommodate the hub 37 of the sleeve 15 and which may be placed over said hub and then by means of a smaller aperture shown in dotted lines in Fig. 15 brought under the projecting flange 37, and held in place on top of the gear 31 by means of two projecting prongs 38 likewise preferably punched out of the body of the material of the plate 35. When the plate 35 is thus placed over the projection 37 and forced to the left, as shown in Fig. 15, under said projection, the prongs 38 catch with the arms 34 and hold the said plate 35 in position, thereby pressing the gear 31 closely into association with the plate 32. It is a simple matter thus to remove the gear 31 as all that is necessary is to slightly spring the plate 35 to release the projections 38 from the arms and then push said plate to the right, referring to Fig. 15, so that the said plate 35 may be removed, whereupon the gear wheel 31 may be readily removed. After the structure is assembled, however, as shown in Fig. 15, the gear wheel 31 is rotated with the sleeve 15 on account of the prongs 33 when the plate 32 is traveling as shown in Fig. 16. Now, should the main spring break and recoil, however, and rapidly rotate the gear wheel 17, thereby rapidly rotating the sleeve 15 in the opposite direction, then the prongs 33 somewhat similar to a ratchet mechanism will slide under the arms 34 and will not rotate the said gear wheel in this opposite direction of rotation. Thus, when the spring uncoils, no damage is done to the operating mechanism of the watch on account of the improved mounting of said gear wheel 31 which permits of its rotation in one direction, but prevents its rotating in the opposite direction.

Referring more particularly to Figs. 14 and 17, I provide upon the framework 39 of the watch mechanism a bearing structure 40 secured thereto by means of the screws 41. This bearing structure confines the gear mechanism and furnishes a bearing for the second hand wheel above referred to and has a further novel feature to obviate the injurious influence of friction to a large extent between the sleeve pinions and the arbor 14.

It will be noticed that the tendency of the driving gears upon the sleeved pinion 25 on account of the arrangement of the gear wheels as shown is approximately in the direction of the arrow shown in Fig. 17. To counterbalance this effort, I provide a spring clip 42 which preferably forms part of a cap 43 which is sprung into the annular recess provided in the structure 40 as will be more clearly apparent from Figs. 14 and 17. The projection 44 alines this cap 43 properly. The prong 42 in addition to exerting an influence in opposition to the general direction of the pressure occasioned by the driving gear wheels, also has a downward pressure as will be seen more clearly from Fig. 14, thus to hold sleeve pinion 25 in close relation downwardly, and steady the movement of said second hand wheel 25. Friction is thus provided to steady the second hand and prevent jerking thereof.

By referring more particularly to Fig. 7, I show a prong 45 which is designed to accomplish the same result as the prong 42 in Fig. 17 in this Fig. 7. I also show in Fig. 7 a modification in which the pinion 30 and its associated pinion or gear wheel 29 are of such size and number of teeth that the said gear wheel 29 may be used directly to drive the second pinion 25 for the second hand without the interposition of the gears 26, 27 and 28 as shown in Fig. 18.

I show further in Fig. 21 a modification of the minute hand arbor and driving sleeve structure of Fig. 14, and there show a sleeve 15$^b$ and a minute hand arbor 14$^b$, which arbor has the legs 19$^b$ adapted to engage a conical recess 46 in said sleeve 15$^b$, thereby to rotate the arbor 14$^b$ in its proper position and in such a manner as to provide sufficient friction so that the arbor 14$^b$ may be properly driven by the sleeve 15$^b$.

Referring more particularly to Figs. 18, 19 and 20, I set forth an improved mechanism for setting the watch which contemplates in its preferred embodiment not only the setting of the minute and hour hands but also the dissociation of the second hand sleeve pinion from the gear train during the setting operation so that the second hand may be freed from its driving gear and be properly set. I before set forth that the idler pinion 26 is used to drive the second hand sleeve pinion 25 from the pinion 27. My improved mechanism contemplates the winding and setting stem 47 fixedly secured to the operating gear 48, which operating gear is permanently in association with the gear wheel 49. The gear wheel 49 together with meshing gears 50 and 51 are mounted in a pivoted structure 52 normally held by means of the spring 53 in the position shown in Fig. 18. When the stem 47 is rotated in this position, the gear wheel 48 through the interposition of the gear wheels 49 and 50 rotates the winding gear 54 of the main spring. Now, when it is desired to set the watch, the lever 55 is drawn outwardly as shown in Fig. 19 and thereby disengages the gear 50 from the gear 54 and engages the gear wheel 51 with the gear wheel 22 of the gear train. When rotating the stem 47 in this position, the gear wheel 48 through the interposition of the gear wheels 49, 51 and 22 rotates the gear 21 of the hour hand and also through the interposition of the gear wheel 21 the minute arbor 14 by permitting the minute arbor 14 to slide within the sleeve 15 as the pressure exerted upon the spindle 47 is sufficient to overcome this frictional engagement between the elements 14 and 15. When the lever 55 is thus drawn outwardly, it carries with it a second lever 56 through the agency of the pin or stud 57, which lever 56 is normally held in the position of Fig. 18 by the spring 57$^a$. A lever 56 through the agency of its arm 58 carries the idler gear wheel 26 which normally meshes with the second wheel 25 and the gear wheel 27. The sleeve wheel 25 which carries the second hand is therefore disconnected from the gear train and the second hand may be properly set without injury to the mechanism. The lever 56 is mounted upon an eccentrically adjustable bearing 59, which bearing may be adjusted over its shaft 60 so as to carry the gear 26 into the proper alinement from left to right, referring to Fig. 19, whereby to properly mesh with the gears 25 and 27. To properly adjust the limiting position of the idler 26 in a direction substantially at right angles to this adjustment so as to permit of a universal adjustment of said idler pinion, I provide an eccentrically adjustable stop 61 mounted upon the shaft 62, and which is adapted to be engaged by and form the limiting position of an arm 63 carried by the arm 58. It will be seen by the adjustment of the elements 59 and 61, the limiting position of the idler 26 may be universally adjusted.

In Fig. 11, I show a detail view of an improved form of the sleeve pinion 25 which is particularly designed to accommodate hands frictionally in such a way as to permit of the ready adjustment and removal of these hands. To this end, I provide a preferably triangular groove 64 which is adapted to co-act with a hand 8$^c$ as shown in Fig. 12, which hand has a circular portion 65 being split at 66 so that it may be mounted upon the arbor of this pinion, the spring action being sufficient to maintain the relative position of the hand with the pinion 25 except when said hand 8$^c$ is forcibly moved for setting purposes, at which time the frictional engagement must, of course, be overcome. At 66$^a$ I show the hand structure as curved so as to provide a longitudinal spring engagement between said hand and the groove 64.

In Fig. 13, I further show a modified form of hand 8ᵈ which has a split tail piece 67 so that it may be sprung into place and yet have sufficient spring action to maintain its relative position under normal operation. I elevate the portion $f$ of the hand 8ᵈ above its plane and depress the portion $g$ below its plane so that these displaced portions provide a longitudinal spring action to properly aline the hand.

In Fig. 22, I show an improved hand structure which may be applied to any hand, but which is here set forth as the minute hand 6 of Figs. 1, 3 and 5, which hand 6 has an enlarged flat portion 68, at which enlarged portion 68, as shown in Fig. 22, the metal is thinner so as to provide a good spring action to maintain the hands in their pressure against the dial without sacrificing the transverse rigidity of the hand structure.

It will be apparent from what has hitherto been described that by mounting the second hand concentrically, I may provide a dial which can be universally used both for open face and hunting case watches by merely rotating the dial through the necessary arc of ninety degrees. By providing an interchangeable dial, my improvements above set forth may be applied to watches now in use and to this end means must be provided to accommodate my improved dial upon watches of present day design.

The framework 39 of watches is usually provided with recesses to accommodate small legs or pins 69 to hold the dial in place. These recesses are found at different places on the circumferential edge of the structure 39. I therefore provide pins 69 which may be adjustably mounted with respect to the dial 2. These pins 69 are carried upon a plate 70, which plate is secured to a second plate 71 through the agency of the screws 72. The plates 70 and 71 are designed to operate in a flanged recess 73 of the dial 2 and when the plate 70 is screwed to the plate 71, the structure comprising the elements 69, 70 and 71 is rigidly secured to the dial 2 and is movable circumferentially in the recess 73 so that the pins 69 may be placed at the desired angular position. On account of the eccentric mounting of the pins 69 relative to the screw 72, radial adjustment of these pins relative to the dial is also permitted. In order to provide for accommodating the mounting elements 69, 70 and 71 within the recess 73 without unscrewing the parts, I provide an enlarged portion 74 through which the plates 71 may be inserted within the recess 73 and then moved circumferentially into their proper positions.

In Fig. 8, I show the dial 2 as sloping at 75 so as to accommodate the sloping edge of the crystal 76. The hand 6ᵃ is bent to conform to this slope.

From what has been described, it will be seen that I am enabled by virtue of my improved structure to utilize the new dial arrangement and a new second hand mechanism which thereby permits me to utilize interchangeable dials and readily interchangeable and replaceable setting and driving wheels.

In Figs. 24 and 25, I show a metallic ring 77 made of ductile material such as brass, for instance, and which is provided with primarily upturned flanges 78, 79, 80 and 81, which when in their elevated position are so arranged that they may receive washer-like dial plates 82 and 83 respectively and which have the indicia which it is desired to provide in the dial. After these washer-like dial plates have been placed upon the metallic ring 77, the flanges 78, 79, 80 and 81 are bent over as shown in Fig. 25 to hold said dial sections 82 and 83 in place. The central dial section 84 may be provided and held between the projecting end 85 of the section 77 and the angular projection 86. The dial structure is thus arranged to accommodate any desired dial plates having desired indicia.

It will, of course, be understood that by describing the specific embodiment set forth herein, I do not mean this as any limitation upon the broad features of my invention, as I am describing herein merely one form of carrying out my invention. While I have therefore specifically described one form of carrying out my invention, I do not mean to limit myself to such specific structure but claim broadly as my invention:—

1. Apparatus of the character described comprising a watch or clock dial, two hands coöperating therewith, and annular means extending between said hands and coöperating with the dial, said last mentioned means forming a means whereby one of said hands is prevented from falling on top of and engaging the other hand.

2. Apparatus of the class described comprising a watch or clock dial, a pair of hands mounted above said dial and coöperating therewith, and means extending between said hands to prevent touching of said hands.

3. Apparatus of the class described comprising a watch or clock dial, a pair of hands mounted above said dial and coöperating therewith, and means extending between said hands to prevent touching of said hands, said means being interposed between said dial and one of said hands.

4. Apparatus of the character described including a watch or clock dial, two hands mounted above said dial and coöperating therewith, and annular means extending between said hands to prevent touching of said hands.

5. Apparatus of the character described including a watch or clock dial, two hands mounted above said dial and coöperating therewith, and circumferential means extending between said hands to prevent touching of said hands.

6. Apparatus of the character described including a watch or clock dial, two hands mounted above said dial and coöperating therewith, and means extending between the pointing ends of said hands to prevent touching of said hands.

7. Apparatus of the character described including a watch or clock dial having a depressed eccentric second track, a second hand and a hand coöperating with said dial, and means to provide an unbroken guideway for the hand which coöperates with said dial.

In witness whereof, I hereunto subscribe my hand this fifteenth day of November A. D., 1910.

HELGE A. BORRESEN.

Witnesses:
OTTO M. WERMICH,
HAZEL JONES.

Copies of this patent may be obtained for five cents each, by addressing the "Commissioner of Patents, Washington, D. C."